United States Patent [19]
Ishihara et al.

[11] Patent Number: 5,137,491
[45] Date of Patent: Aug. 11, 1992

[54] AIR SPOUT DEVICE FOR AIR CONDITIONING SYSTEM FOR USE IN AUTOMOTIVE VEHICLE

[75] Inventors: Yuji Ishihara; Mitsuru Taguchi, both of Kanagawa, Japan

[73] Assignee: Nissan Motor Co., Ltd., Yokohama, Japan

[21] Appl. No.: 708,054

[22] Filed: May 30, 1991

[30] Foreign Application Priority Data

Jun. 4, 1990 [JP] Japan .................................. 2-145988

[51] Int. Cl.⁵ ............................................... B60H 1/34
[52] U.S. Cl. .................... 454/152; 454/309; 454/322
[58] Field of Search .................. 98/2, 40.05, 40.14, 98/40.16, 40.17, 40.2, 40.24

[56] References Cited

U.S. PATENT DOCUMENTS

| | | | |
|---|---|---|---|
| 2,996,973 | 8/1961 | Boysen | 98/40.24 X |
| 3,994,335 | 11/1976 | Perkins | 165/35 |
| 4,686,890 | 8/1987 | Stouffer et al. | 98/2 |

FOREIGN PATENT DOCUMENTS

| | | | |
|---|---|---|---|
| 368017 | 5/1990 | European Pat. Off. | 98/2 |
| 2585636 | 2/1987 | France | 98/2 |
| 151410 | 9/1982 | Japan | 98/2 |
| 199211 | 11/1983 | Japan | 98/2 |
| 62-1855 | 1/1987 | Japan | |

*Primary Examiner*—Harold Joyce
*Attorney, Agent, or Firm*—Foley & Lardner

[57] ABSTRACT

An air spout device for an air conditioning system comprises a duct having an intake portion and a ventilator spout. A plurality of guide vanes are arranged in the duct to define passages, and a plurality of dampers are arranged between the intake portion and the plurality of guide vanes to selectively open and close the passages, the plurality of dampers being rotatable with its shaft to assume concentration blow, diffusion blow, and avoidance blow modes. A blow mode selecting mechanism is operatively connected to the shaft to allow the plurality of dampers to assume the concentration blow, diffusion blow, and avoidance blow modes.

4 Claims, 9 Drawing Sheets

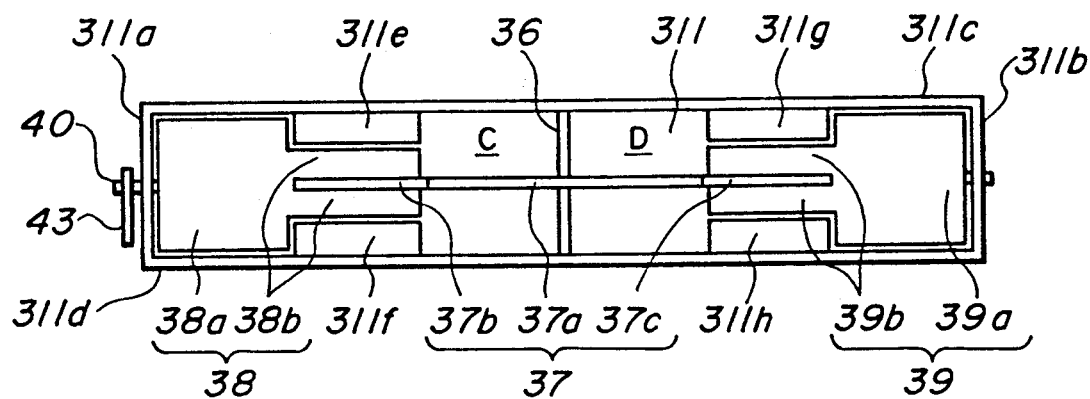
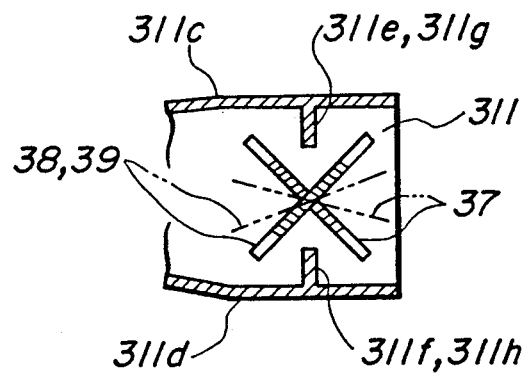
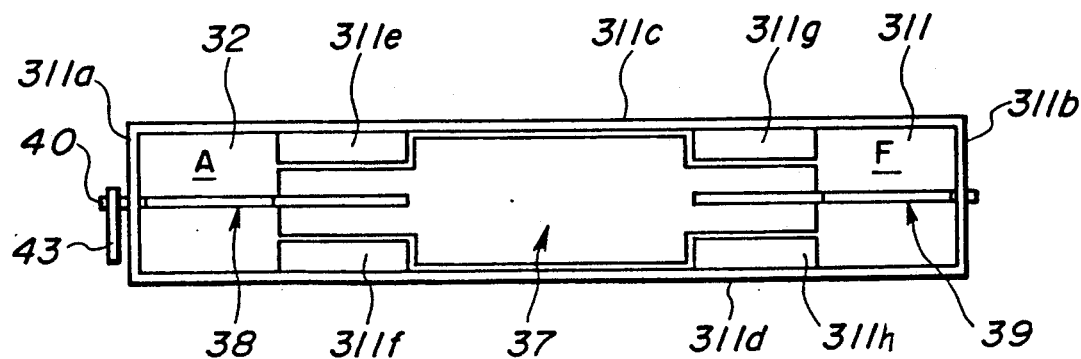

FIG. 5
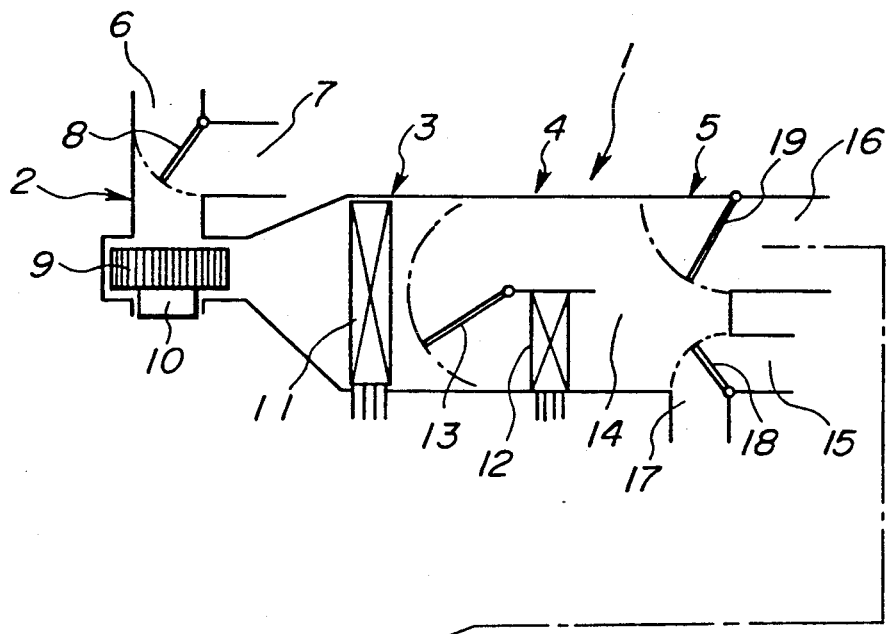
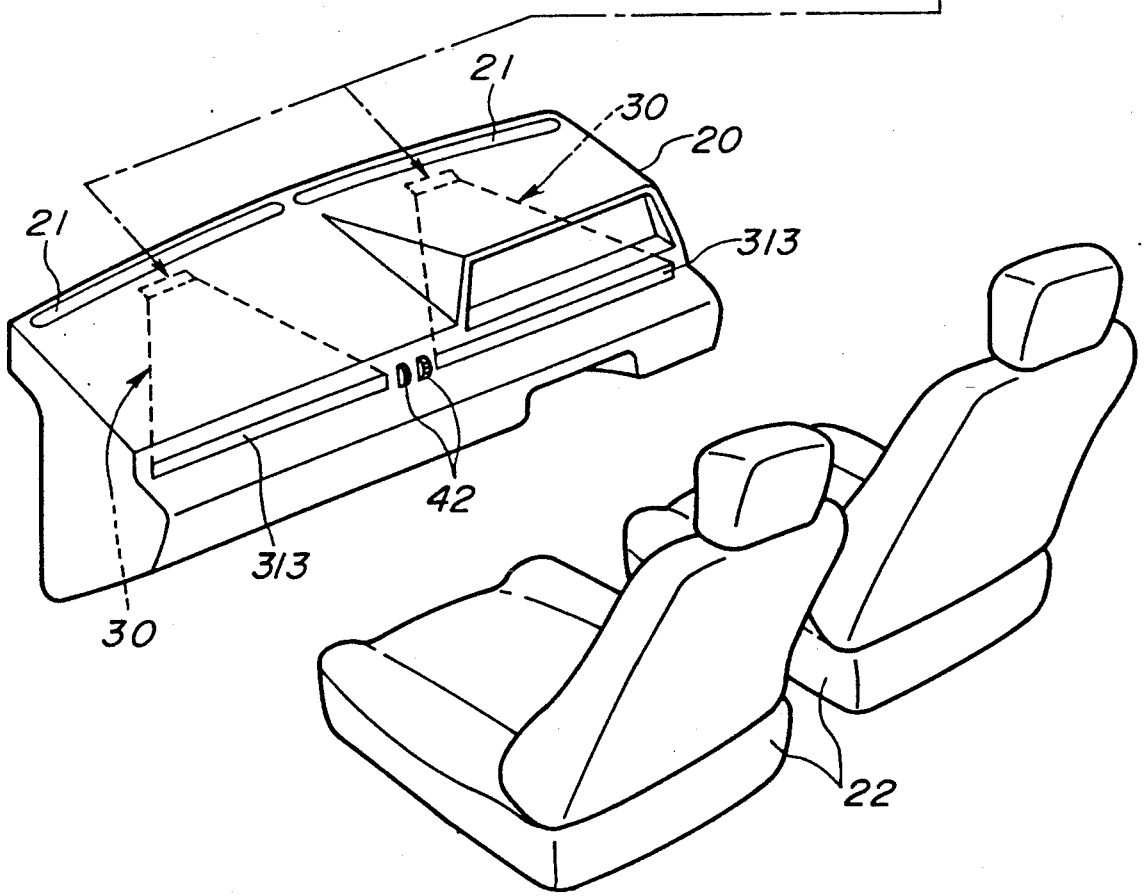

FIG.17
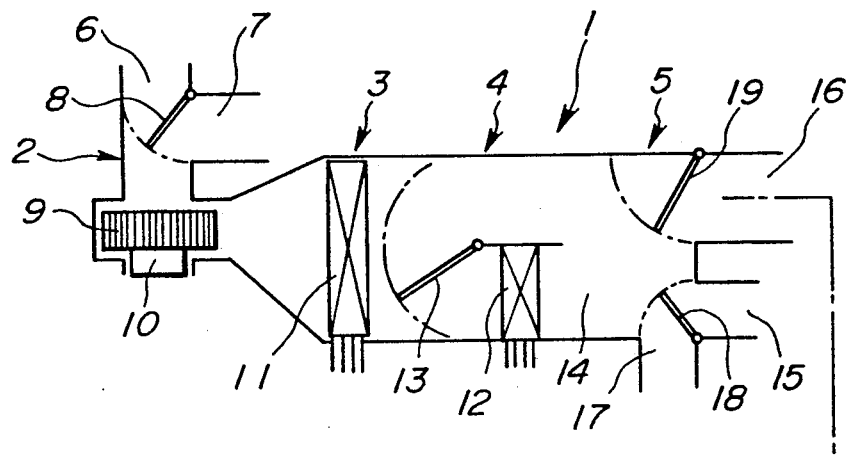
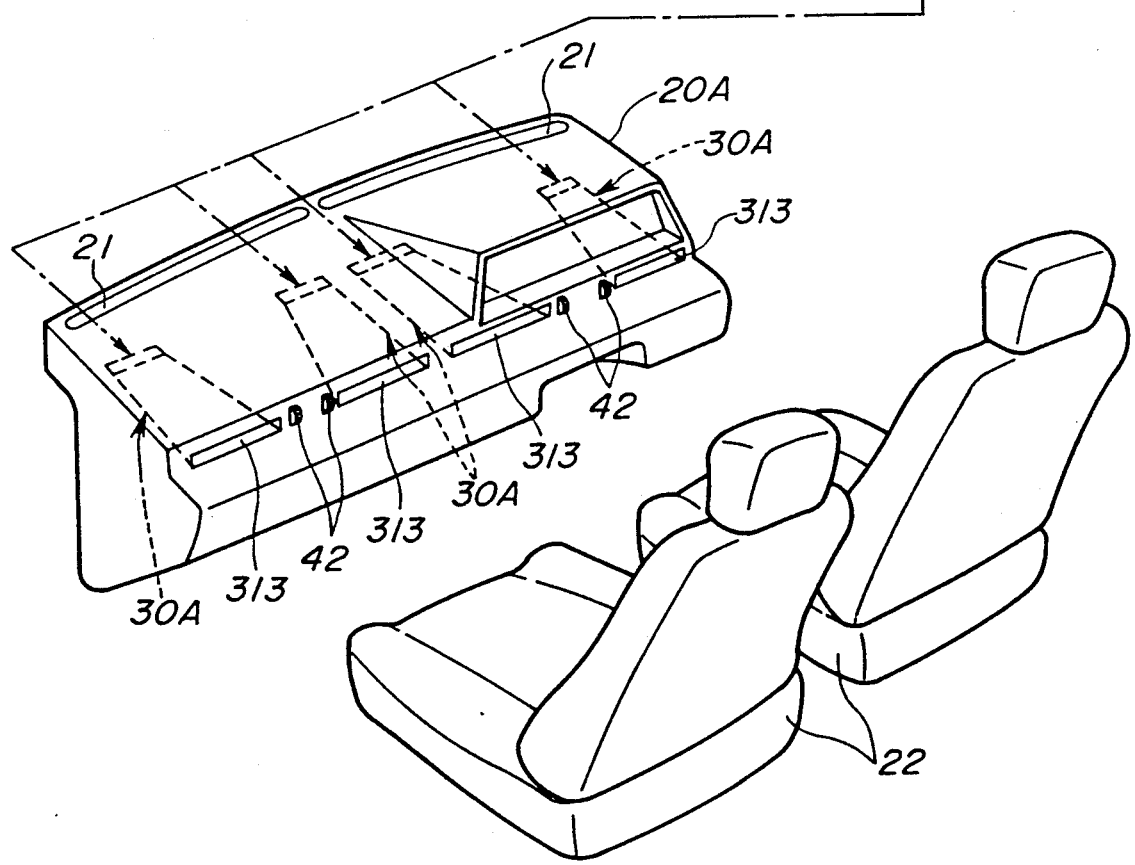

AIR SPOUT DEVICE FOR AIR CONDITIONING SYSTEM FOR USE IN AUTOMOTIVE VEHICLE

BACKGROUND OF THE INVENTION

The present invention relates to an air spout device for an air conditioning system for use in an automotive vehicle.

There are known various types of air spout devices for an air conditioning system for use in an automotive vehicle. One is disclosed in JP-B2 62-1855 in which an air spout device is constructed to be long from side to side, and uniformly blows cool or hot air substantially in overall width of an automotive vehicle, or in overall width of right or left half thereof. Another is disclosed in U.S. Pat. No. 3,994,335 in which parallel damper devices or air spout devices are constructed to have two blow modes of cool or hot air which can be switched.

With such known air spout device, two blow modes can be obtained: a concentration blow mode for providing cool or hot air to a passenger in a concentrated manner, and a diffusion blow mode for providing cool or hot air in a wide area of a cabin including the passenger. The air spout device is changeable in blow mode between the two, but does not have the other particular blow mode.

In view of human engineering, a wind feel of the passenger depends on not only his mental state, working state, clothes, and weather, but his race, sex, and age, and assumes a remarkable individual variation. Accordingly, only two blow modes are not sufficient for the passenger who is delicate in wind feel, and can give him a discomfort as the case may be. Further, a minimum wind velocity cannot be kept to blow off warm air heated by a sunlight, etc. and surrounding the passenger, giving him a discomfort.

SUMMARY OF THE INVENTION

It is, therefore, an object of the present invention to provide an air spout device for an air conditioning system for use in an automotive vehicle which much contributes an improvement in comfort of a passenger.

It is another object of the present invention to provide an air spout device for an air conditioning system for use in an automotive vehicle which can modify a wind feel in accordance with a passenger's demand.

There is provided, according to the present invention, an air spout device for an air conditioning system, comprising:

a duct including wall means for defining an open ended bore, said open ended bore having an inlet and an outlet;

a plurality of guide vanes arranged in said open ended bore to define a plurality of passages;

a plurality of dampers arranged between said inlet and said outlet to selectively open and close said plurality of passages, said plurality of dampers being movable to assume a plurality of positions; and a blow mode selecting mechanism operatively connected to said plurality of dampers, said blow mode selecting mechanism allowing said plurality of dampers to assume said plurality of positions.

BRIEF DESCRIPTION OF THE DRAWINGS

FIG. 2 is a front view illustrating an intake portion of a duct of the air spout device which assumes a concentration blow mode;

FIG. 3 is a cross sectional view illustrating the intake which assumes a diffusion blow mode;

FIG. 4 is a view similar to FIG. 2, illustrating the intake which assumes an avoidance blow mode;

FIG. 5 is a fragmentary perspective view illustrating a front seat/instrument panel portion of an automotive vehicle with a body of an air conditioning system to which the first preferred embodiment is applied;

FIG. 17 is view similar to FIG. 5, illustrating a front seat and instrument panel portion of an automotive vehicle with a body of an air conditioning system to which the third preferred embodiment is applied;

DETAILED DESCRIPTION OF THE INVENTION

Referring to FIGS. 1 to 8, particularly to FIG. 5, there is shown an air conditioning system for an automotive vehicle to which an air spout device 30 for a passenger seated on a front seat 22 is applied.

Figure 6:
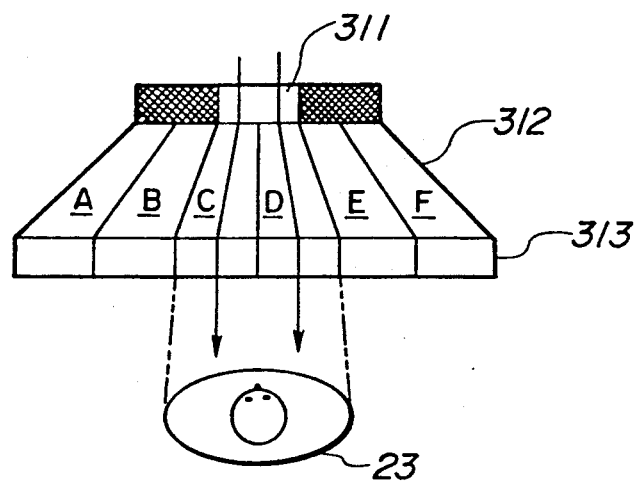
FIG. 6 is a diagrammatic view illustrating the air spout device which assumes the concentration blow mode.
Figure 7:
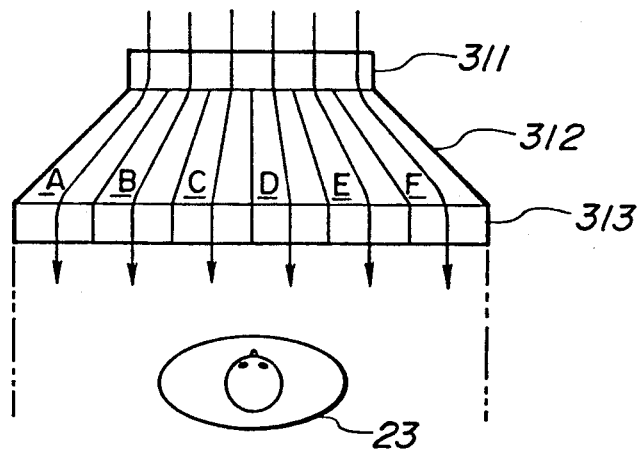
FIG. 7 is a view similar to FIG. 6, illustrating the air spout device which assumes the diffusion blow mode.
Figure 8:
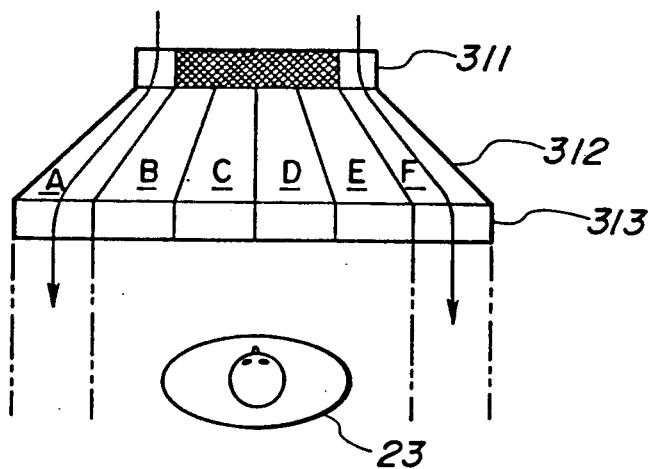
FIG. 8 is a view similar to FIG. 7, illustrating the air spout device which assumes the avoidance blow mode.

A body 1 of the air conditioning system includes a blower unit 2, a cooling unit 3, a heater unit 4, and a duct unit 5. The blower unit 2 includes an outside air intake 6, an inside air intake 7, an intake door 8, and a blower fan 9. The outside air intake 6 is arranged to introduce outside air under wind pressure during vehicle run, whereas the inside air intake 7 is arranged to introduce air in a cabin. The intake door 8 is arranged to selectively open and close the outside air intake 6, and the inside air intake 7. The blower fan 9 is rotated by a blower fan motor 10. The cooling unit 3 includes an evaporator 11 which refrigerates air passing therethrough by a refrigerant supplied from a refrigeration cycle having a compressor, a condenser, an expansion valve, etc. (not shown). The heater unit 4 includes a heater core 12, an air mix door 13, and an air mix chamber 14. The heater core 12 is arranged to heat air passing therethrough by warm water supplied from a heating cycle including an engine, a warm water cock, etc. (not shown). The air mix door 13 is arranged to open and close to adjust an amount ratio of cool air to hot air. It is to be noted that the cool air is obtained by bypassing the heater core 12 after the evaporator 11, and that the hot air is obtained by passing through the heater core 12 after the evaporator 11. The duct unit 5 includes a defroster duct 15, a ventilator duct 16, a foot duct 17, and two doors 18 and 19. The defroster duct 15 is connected to a defroster spout 21 arranged to an instrument panel 20, and it blows cool or hot air toward a front window (not shown). Referring to FIGS. 6 to 8, the ventilator duct 16 is connected to a plurality of ventilator spouts 313 each serving as an outlet of the air spout device 30, and arranged within the instrument panel 20 in a transverse direction of an automotive vehicle, and it blows cool or hot air toward an upper half of body of a passenger 23 who is seated on the front seat 22 in a manner opposite to the plurality of ventilator spouts 313. A spout of the foot duct 17 blows cool or hot air toward feet of the passenger 23. The door 18 is arranged to selectively open and close the defroster duct 15, and the foot duct 17, whereas the door 19 is arranged to open and close the ventilator duct 16.

Figure 1:
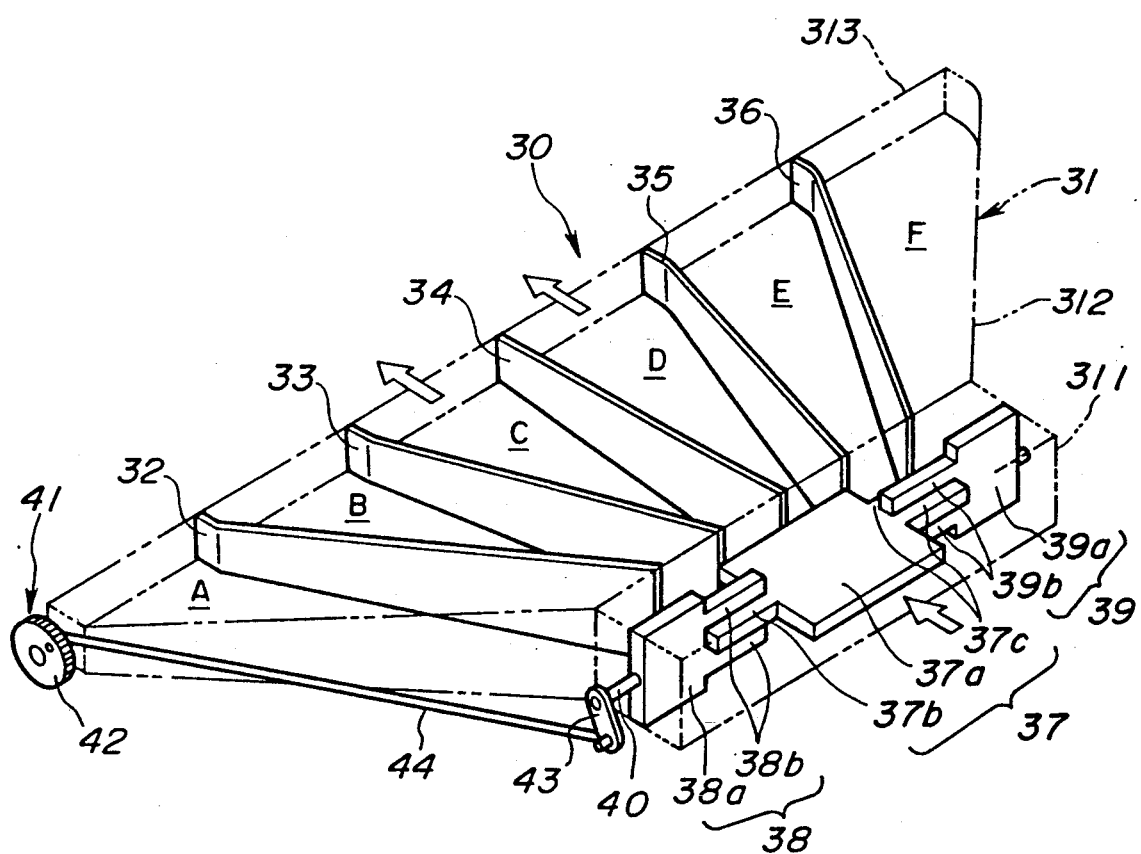
FIG. 1 is a perspective view illustrating a first preferred embodiment of an air spout device for an air conditioning system for use in an automotive vehicle according to the present invention.

Referring to FIG. 1, the air spout device 30 includes a duct 31, a plurality of guide vanes 32, 33, 34, 35, and 36, a plurality of dampers 37, 38, and 39, and a blow mode selecting mechanism 41.

The duct 31 includes an intake portion 311, an air passage 312, and the ventilator spout 313 as constructed to be long from side to side. It takes cool or hot air in the intake portion 311 via the ventilator duct 16 of the body 1 of the air conditioning system, and blows it in the cabin from the ventilator spout 313 via the air passage 312.

The plurality of guide vanes 32 to 36 are arranged between the intake portion 311 and the ventilator spout 313 in a manner as separated in the transverse direction of the vehicle. The guide vanes 32 to 36 extend from the air passage 312 to the ventilator spout 313, thus dividing, in the transverse direction of the vehicle, the air passage 312 and the ventilator spout 313 into six parts designated by reference numerals A, B, C, D, E, and F.

The plurality of dampers 37 to 39 are arranged between the intake portion 311 and the ventilator spout 313 in a manner as divided in the transverse direction of the vehicle to avoid interfering with the guide vanes 32 to 36. The dampers 37 to 39 are combined in a cross manner as viewed from a longitudinal direction thereof, thus selectively opening and closing the passages A to F between the intake portion 311 and the ventilator spout 313.

Specifically, the middle damper 37 includes a plurality of portions having different areas, viz., a large portion 37a, and two small portions 37b and 37c. The large portion 37a corresponds to a section from the guide vane 33 to the guide vane 35 via the guide vane 34, viz., the passages C and D. Referring also to FIG. 2, the small portion 37b extends from the large portion 37a to one side wall 311a of the intake portion 311, and corresponds to a section from the guide vane 33 to the guide vane 32, viz., the passage B. The small portion 37c extends from the large portion 37a to the other side wall 311b of the intake portion 311, and corresponds to a section from the guide vane 35 to the guide vane 36, viz., the passage E.

Referring also to FIG. 2, the damper 38 includes a plurality of portions having different areas, viz., a large portion 38a, and a small portion 38b. The large portion 38a corresponds to a section from the one side wall 311a of the intake portion 311 to the guide vane 32, viz., the passage A. The small portion 38b extends from the large portion 38a to the large portion 37a of the middle damper 37, and corresponds to a section from the guide vane 32 to the guide vane 33, viz., the passage B.

The damper 39 includes a plurality of portions having different areas, viz., a large portion 39a, and a small portion 39b. The large portion 39a corresponds to a section from the other side wall 311b of the intake portion 311 to the guide vane 36, viz., the passage F. The small portion 39b extends from the large portion 38a to the large portion 37a of the middle damper 37, and corresponds to a section from the guide vane 35 to the guide vane 36, viz., the passage E.

The small portion 37b of the damper 37 and the small portion 38b of the damper 38 are combined in a cross manner, and the small portion 37c of the damper 37 and the small portion 39b of the damper 39 are also combined in a cross manner, thus obtaining the plurality of dampers 37 to 39 combined at an angle of, for example, 90° as viewed from the longitudinal direction thereof. A shaft 40 protruding from the dampers 38 and 39 in the longitudinal direction thereof is supported on the side walls 311a and 311b of the intake portion 311. Referring to FIG. 2, when the intake portion 311 is partly closed by the dampers 38 and 39, the small portions 38b and 39b of the dampers 38 and 39, and partitions 311e, 311f, 311g, and 311h of the upper and lower walls 311c and 311d of the intake portion 311 are placed one upon another in a vertical direction thereof, and the dampers 38 and 39 thus close portions corresponding to the passages A, B, E, and F of the intake portion 311. Referring to FIG. 4, when the intake portion 311 is partly closed by the damper 37, the small portions 37b and 37c of the damper 37, and the partitions 311e, 311f, 311g, and 311h are placed one upon another in a vertical direction thereof, and the damper 37 thus closes portions corresponding to the passages B, C, D, and E of the intake portion 311.

On the other hand, the blow mode selecting mechanism 41 permits selection of a blow mode of cool or hot air as provided in the cabin from the intake portion 311 among concentration blow, diffusion blow, and avoidance blow modes, and it includes an operation member 42 in the shape of a disc, a lever 43, and a rod 44 as shown in FIG. 1. The operation member 42 is stationarily and rotatably mounted to the outside of one side wall of the ventilator spout 313 in positions of the concentration blow, diffusion blow, and avoidance blow modes, respectively. Referring to FIG. 5, when the air spout device 30 is arranged within the instrument panel 20, the operation member 30 includes a portion partly protruding from the instrument panel 20 in a portion thereof easy to operate by the passenger, and having marks such as a character, a figure, etc. (not shown) which indicate the positions of the concentration blow, diffusion blow, and avoidance blow modes. The lever 43 is fixedly mounted to the shaft 40 protruding from the side wall 311a which is located on the same side as the operation member 42 of the intake portion 311. The rod 44 is arranged to connect the operation member 42 to the lever 43, and it has one end rotatably connected to the operation member 42 at the periphery thereof and in a portion not protruding from the instrument panel 20, and the other end rotatably connected to the lever 43 at the free end thereof.

Next, the operation of the first preferred embodiment will be described.

Referring to FIG. 5, when the air spout device 30 is arranged within the instrument panel 20, the passenger rotates the operation member 42 by the portion thereof protruding from the instrument panel 20, which is located on the side of the air spout device 30 opposite to the passenger, and stationarily hold it in one of the positions of the concentration blow, diffusion blow, and avoidance blow modes based on the mark (not shown) of the operation member 42. By this, as shown in FIG. 1, torque of the operation member 42 is transmitted to the shaft 40 through the lever 43, rotating the plurality of dampers 37 to 39 on the shaft 40. Then, the damper 37 is stopped in a position to partly open the intake portion 311, whereas the dampers 38 and 39 are stopped in a position to close the intake 311 for the rest as shown in FIGS. 1 and 2, thus obtaining the concentration blow mode of the air spout device 30 as shown in FIG. 6. Or, all the dampers 37 to 39 are stopped in a position to fully open the intake portion 311 as shown in FIG. 3, thus obtaining the diffusion blow mode of the air spout device 30 as shown in FIG. 7. Or, the damper 37 is stopped in a position to partly close the intake portion 311, whereas the dampers 38 and 39 are stopped in a position to open the intake portion 311 for the rest as shown in FIG. 4, thus obtaining the avoidance blow mode of the air spout device 30 as shown in FIG. 8.

Specifically, in the concentration blow mode as shown in FIGS. 1 and 2, the large portions 38a and 39a of the dampers 38 and 39 close a section corresponding to the passages A and F of the intake portion 311, viz., a portion having a network in FIG. 6; the small portions 38b and 39b of the dampers 38 and 39 cooperate with the partitions 311e, 311f, 311g, and 311h to close a section corresponding to the passages B and E, viz., the portion having a network in FIG. 6; and the damper 37 assumes a position to open a section corresponding to the passages C and D of the intake portion 311, viz., a void portion in FIG. 6. When driving the body 1 of the air conditioning system with the door 19 thereof opened, the blower fan 9 rotates to provide cool or hot air via the blower unit 2, the cooling unit 3, and the heater unit 4. The cool or hot air is introduced in the intake portion 311 of the air spout device 30 via the air mix chamber 14, and the ventilator duct 16. As shown in FIG. 6, the cool or hot air as introduced in the intake portion 311 and indicated by arrows then passes from the opened section of the intake portion 311 to the passages C and D defined by the guide vanes 33, 34, and 35, and it is blown, with the range as indicated by two-dotted chain lines, from a portion of the ventilator spout 313 corresponding to the passages C and D in the cabin in a manner as concentrated to the passenger 23.

In the diffusion blow mode as shown in FIG. 3, each of the dampers 37 to 39 assumes a position to fully open the intake portion 311 as indicated by a void portion in FIG. 7. As shown in FIG. 7, when driving the body 1 of the air conditioning system with the door 19 opened, cool or hot air as introduced in the intake portion 311 of the air spout device 30 and indicated by arrows passes from the opened section of the intake portion 311 to the passages A, B, C, D, E, and F, and it is blown, with the range as indicated by two-dotted chain lines, from all the ventilator spout 313 in a wide area of the cabin including the passenger 23.

In the avoidance blow mode as shown in FIG. 4, the large portion 37a of the damper 37 closes a section corresponding to the passages C and D of the intake portion 311, viz., a portion having a network in FIG. 8, and the small portions 37b and 37c of the damper 37 cooperate with the partitions 311e, 311f, 311g, and 311h to close a section corresponding to the passages B and E of the intake portion 311, viz., the portion having a network in FIG. 8, whereas the dampers 38 and 39 assume a position to open a section corresponding to the passages A and F of the intake portion 311, viz., a void portion in FIG. 8. As shown in FIG. 8, when driving the body 1 of the air conditioning system with the door 19 opened, cool or hot air as introduced in the intake portion 311 of the air spout device 30 and indicated by arrows passes from the opened section of the intake portion 311 to the passages A and F defined by the guide vanes 32 and 36, and it is blown, with the ranges as indicated by two-dotted chain lines, from a portion of the ventilator spout 313 corresponding to the passages A and F in the cabin not including the passenger 23.

Figure 9:
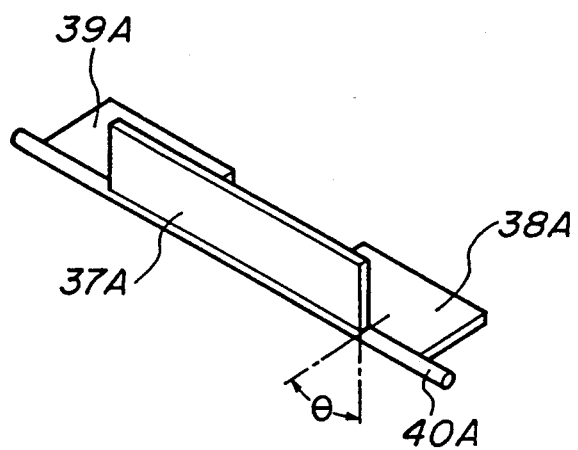
FIG. 9 is a view similar to FIG. 1, illustrating dampers used in a second preferred embodiment of the present invention.
Figure 10:
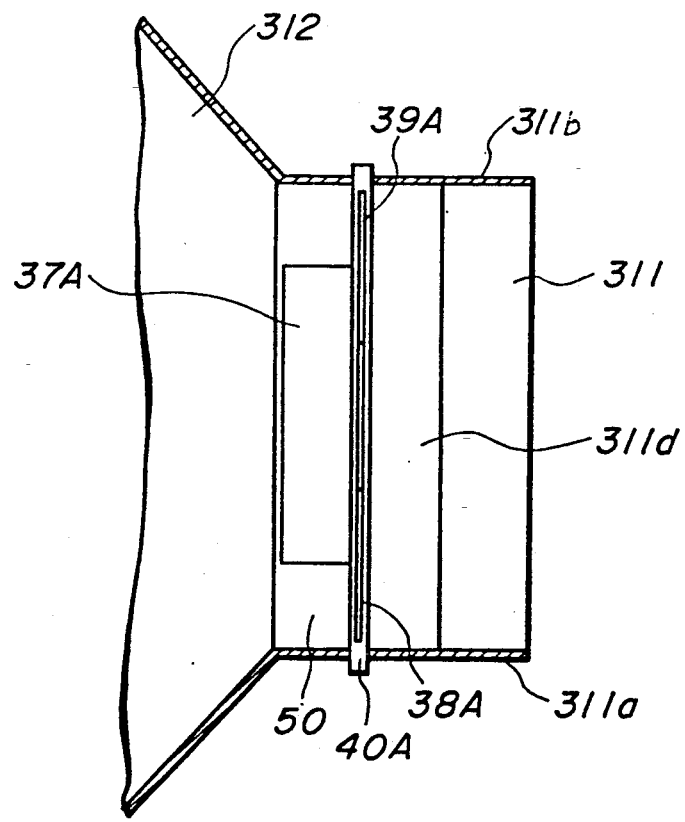
FIG. 10 is a plan view illustrating the dampers of FIG. 9 arranged in an air spout device.
Figure 11:
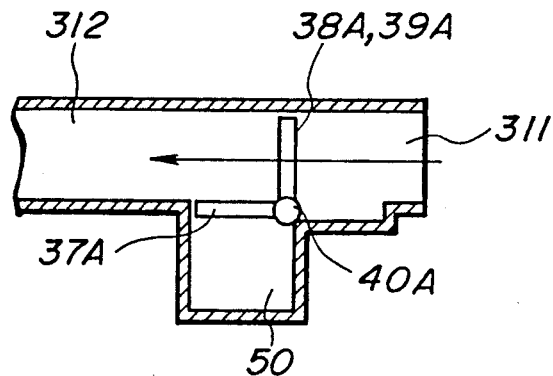
FIG. 11 is a view similar to FIG. 3, illustrating an intake of a duct of the air spout device which assumes the concentration blow mode.

Referring to FIGS. 9 to 13, particularly to FIG. 9, in a second preferred embodiment, a plurality of dampers 37A, 38A, and 39A in the shape of a rectangle are combined in a cross manner at an angle $\theta$ (theta) of, for example, 90° as viewed from a longitudinal direction thereof, each having one long side which overlaps with each other in the longitudinal direction thereof. Referring to FIGS. 10 and 11, the duct 31 has a recess 50 somewhere between the intake portion 311 and the ventilator spout 313 (see also FIG. 1), for example, in the intake portion 311, which is formed to protrude in the upper or lower direction. Supported at a connection of the side walls 311a and 311b of the duct 31 with the recess 50 is a shaft 40A which has end portions protruding from ends of the dampers 38A and 39A on both sides thereof as shown in FIG. 9.

In the second preferred embodiment, when a blow mode selecting mechanism (not shown, but similar to the blow mode selecting mechanism 41 in FIG. 1) which is connected to the end portion of the shaft 40A protruding from the side wall 311a is stationarily held in one of the positions of the concentration blow, diffusion blow, and avoidance blow modes, the plurality of dampers 37A, 38A, and 39A are rotated and stopped on the shaft 40A as shown in one of FIGS. 11 (see also FIG. 10), 12, and 13, thus obtaining one of the concentration blow, diffusion blow, and avoidance blow modes of an air spout device 30.

Specifically, in the concentration blow mode as shown in FIGS. 10 and 11, since the damper 37A assumes a position to close the recess 50 and open the intake portion 311, and the dampers 38A and 39A close the intake portion 311, cool or hot air due to driving of the body 1 of the air conditioning system and as indicated by an arrow in FIG. 11 passes from the opened section of the intake portion 311 to the passages C and D defined by the guide vanes 33, 34, and 35, and it is blown from a portion of the ventilator spout 313 corresponding to the passages C and D in the cabin in a manner as concentrated to the passenger 23 (see FIG. 6).

Figure 12:
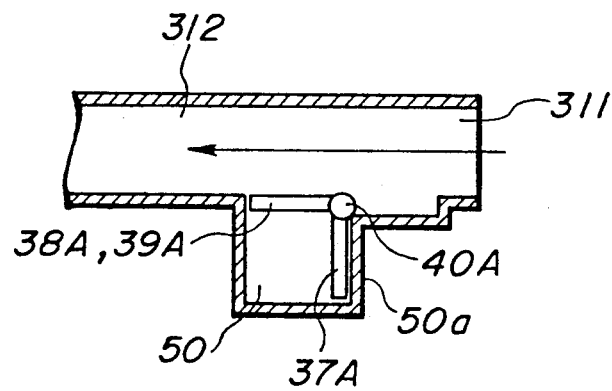
FIG. 12 is a view similar to FIG. 11, illustrating the intake which assumes the diffusion blow mode.

In the diffusion blow mode as shown in FIG. 12, since the damper 37A is placed on a wall 50a of the recess 50 located upstream so as to open the intake portion 311, and the dampers 38A and 39A assume a position to close the recess 50 so as to open the intake portion 311, cool or hot air due to driving of the body 1 of the air conditioning system and as indicated by an arrow in FIG. 12 passes from the opened section of the intake portion 311 to the passages A, B, C, D, E, and F, and it is blown from all the ventilator spout 313 in a wide area of the cabin including the passenger 23 (see FIG. 7).

Figure 13:
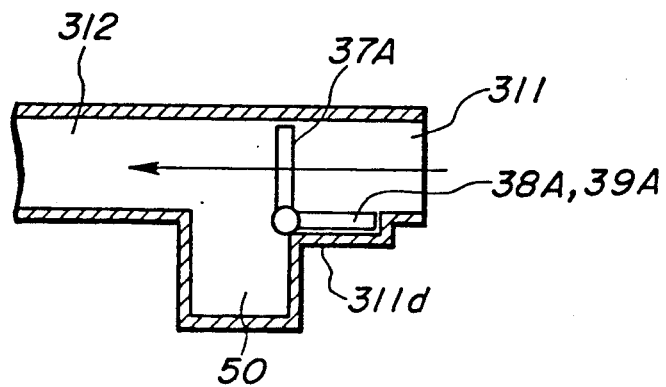
FIG. 13 is a view similar to FIG. 12, illustrating the intake which assumes the avoidance blow mode.

In the avoidance blow mode as shown in FIG. 13, since the damper 37A closes the intake portion 311, and the dampers 38a and 39A are placed on a lower wall 311d of the intake portion 311 located upstream of the recess 50 so as to open the intake portion 311, cool or hot air due to driving of the body 1 of the air conditioning system and as indicated by an arrow in FIG. 13 passes from the opened section of the intake portion 311 to the passages A and F defined by the guide vanes 32 and 36, and it is blown from a portion of the ventilator spout 313 corresponding to the passages A and F in the cabin not including the passenger 23 (see FIG. 8).

Figure 18:
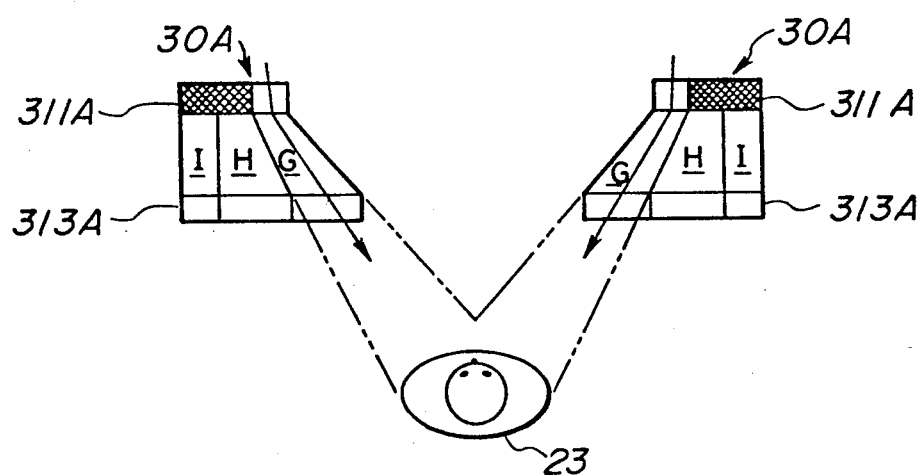
FIG. 18 is a view similar to FIG. 8, illustrating air spout devices which assume the concentration blow mode.
Figure 19:
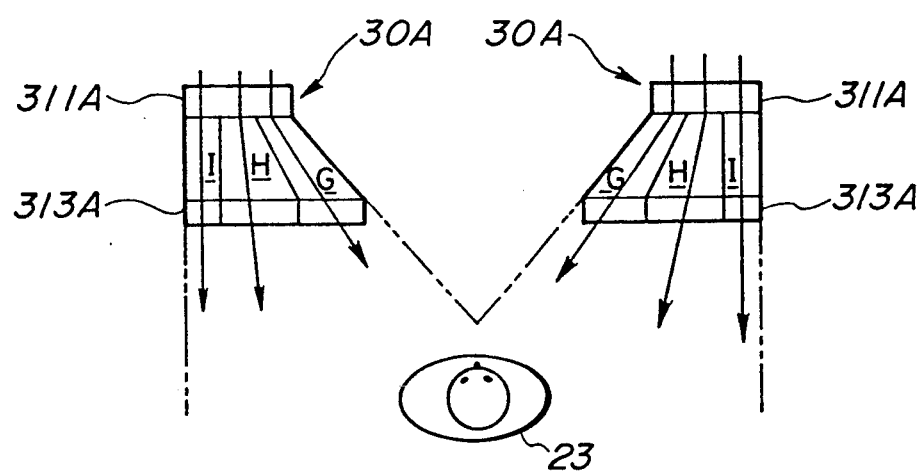
FIG. 19 is a view similar to FIG. 18, illustrating the air spout devices which assume the diffusion blow mode.
Figure 20:
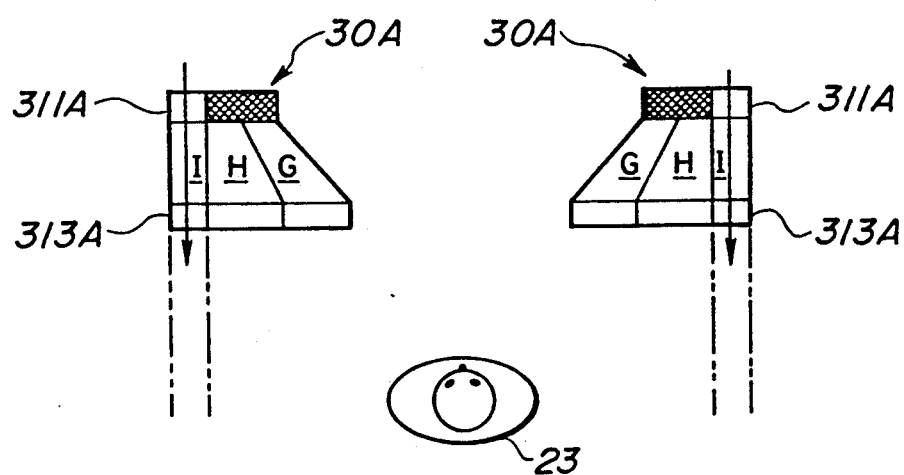
FIG. 20 is a view similar to FIG. 19, illustrating the air spout devices which assume the avoidance blow mode.

Referring to FIGS. 14 to 20, particularly to FIG. 17, in a third preferred embodiment, a plurality of air spout devices 30A are arranged to be offset in a longitudinal direction with respect to a single passenger 23 (see also FIGS. 18 to 20). Thus, with an enlarged installation space of functional parts to be mounted on an instrument panel 20A other than the air spout devices 30A, the air spout devices 30 can be set in one of the concentration blow, diffusion blow, and avoidance blow modes.

Figure 14:
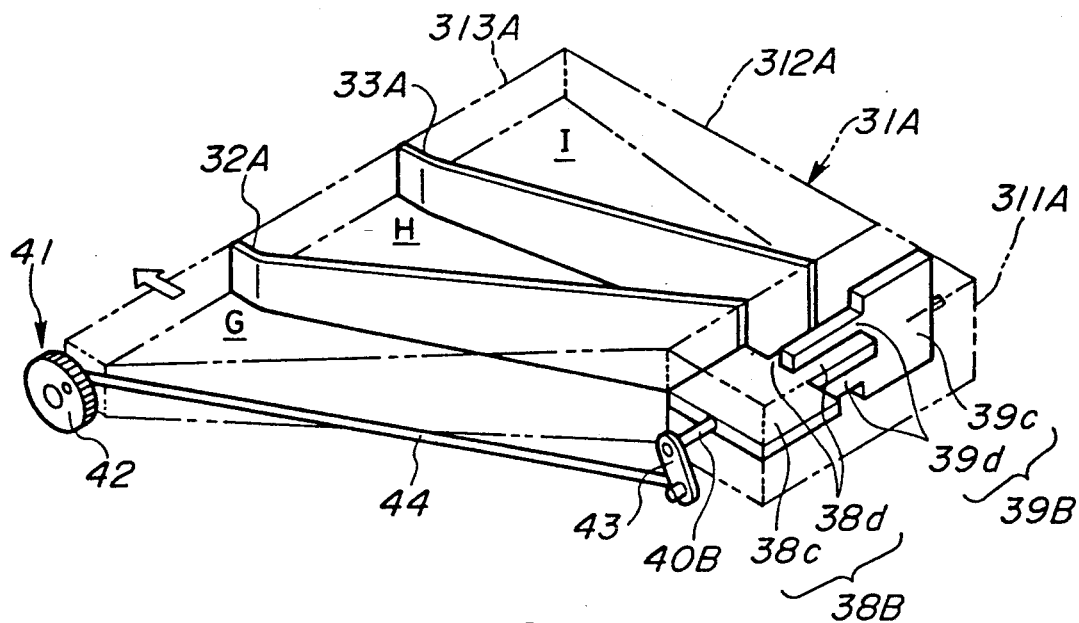
FIG. 14 is a view similar to FIG. 9, illustrating a third preferred embodiment of the present invention.

Referring to FIG. 14, at least two guide vanes 32A and 33A are separately arranged between an intake portion 311A and a ventilator spout 313A, for example, in an air passage 312A up to a ventilator spout 313A, thus dividing the air passage 312A and the ventilator spout 313A into three equal passages G, H, and I.

Referring also FIG. 14, arranged somewhere in the duct 31A, for example, in the intake portion 311A are at least two dampers 38B and 39B which are divided in a longitudinal direction thereof to prevent interference with the guide vanes 32A and 33A. The dampers 38B and 39B include large portions 38c and 39c, and small portions 38d and 39d, respectively.

The large portion 38c of the damper 38B corresponds to a section from a side wall 311a of the intake portion 311A to the guide vane 32A, viz., the passage G, whereas the small portion 38d extends from the large portion 38c to a side wall 311b of the intake portion 311A, and corresponds to a section from the guide vane 32a to the guide vane 33A, viz., the passage H.

On the other hand, the large portion 39c of the damper 39B corresponds to a section from the side wall 311b to the guide vane 33A, viz., the passage I, whereas the small portion 39d extends from the large portion 39c to the side wall 311a, and corresponds to a section from the guide vane 33a to the guide vane 32A, viz., the passage H.

Figure 15:
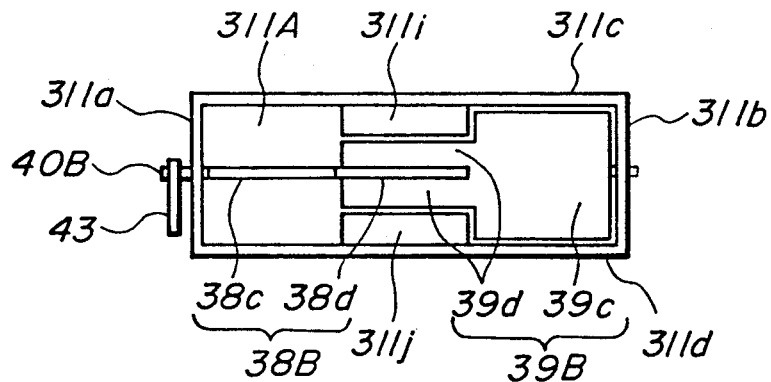
FIG. 15 is a view similar to FIG. 4, illustrating an intake of a duct of an air spout device of FIG. 14, which assumes the concentration blow mode.
Figure 16:
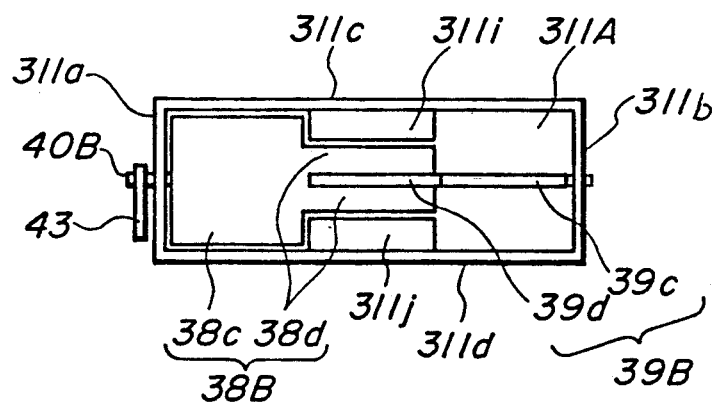
FIG. 16 is a view similar to FIG. 15, illustrating the intake which assumes the avoidance blow mode.

The small portion 38d of the damper 38B and the small portion 39d of the damper 39B are combined in a cross manner, thus obtaining the dampers 38B and 39B combined in a cross manner as viewed from the longitudinal direction thereof. A shaft 40B protruding from the dampers 38B and 39B in the longitudinal direction thereof is supported on the side walls 311a and 311b of the intake portion 311A. Referring to FIGS. 14 and 15, when the intake portion 311A is partly closed by the damper 39B, the small portion 39d of the damper 39B, and partitions 311i and 311j of upper and lower walls 311c and 311d of the intake portion 311A are placed one upon another in a vertical direction thereof, and the damper 39B thus closes portions corresponding to the passages H and I of the intake portion 311A. Referring to FIG. 16, when the intake portion 311A is partly closed by the damper 38B, the small portion 38d of the damper 38B, and the partitions 311i and 311j are placed one upon another in a vertical direction thereof, and the damper 38B thus closes portions corresponding to the passages G and H of the intake portion 311A.

Referring to FIG. 14, connected to the shaft 40B protruding from the side wall 311a of the intake 311A is an air blow mode selecting mechanism 41 which includes an operation member 42, and a lever 43 the same as in the first preferred embodiment.

Referring to FIG. 17, within the instrument panel 20A, the air spout devices 30A as shown in FIG. 14 are symmetrically arranged so that each passage G is on the inside relative to the single passenger 23 seated on one of the front seats 22. The intake portion 311A of each air spout device 30A is connected to a ventilator duct 16 of the body 1 of the air conditioning system in parallel.

Accordingly, in the third preferred embodiment, if the passenger 23 rotates and stationarily holds the operation member 42 in one of the positions of the concentration blow, diffusion blow, and avoidance blow modes, the plurality of dampers 38B and 39B rotate on the shaft 40B. Then, the damper 38B is stopped in a position to partly open the intake portion 311A, whereas the damper 39B is stopped in a position to close the intake portion 311A for the rest as shown in FIGS. 14 and 15, thus obtaining the concentration blow mode of the air spout devices 30A as shown in FIG. 18. Or, all the dampers 38B to 39B are stopped in a position to fully open the intake portion 311A (see FIG. 3), thus obtaining the diffusion blow mode of the air spout devices 30a as shown in FIG. 19. Or, the damper 38B is stopped in a position to partly close the intake portion 311A, whereas the damper 39B is stopped in a position to open the intake portion 311A for the rest as shown in FIG. 16, thus obtaining the avoidance blow mode of the air spout devices 30A as shown in FIG. 20.

Specifically, in the concentration blow mode as shown in FIGS. 14 and 15, the large portion 39c of the dampers 39B closes a section corresponding to the passage I of the intake portion 311A, viz., a portion having a network in FIG. 18; the small portion 39d of the damper 39B cooperate with the partitions 311i and 311j protruding in the intake portion 311A to close a section corresponding to the passage H, viz., the portion having a network in FIG. 18; and the damper 38B assumes a position to open a section corresponding to the passage G of the intake portion 311A, viz., a void portion in FIG. 18. Thus, as shown in FIG. 18, cool or hot air due to driving of the body 1 of the air conditioning system and as indicated by arrows passes from the opened section of the intake portion 311A to the passage G defined by the guide vane 32A, and it is blown, with the range as indicated by two-dotted chain lines, from a portion of the ventilator spout 313A corresponding to the passage G in the cabin in a manner as concentrated to the passenger 23.

In the diffusion blow mode, all the dampers 38B and 39B assume a position to fully open the intake portion 311A (see FIG. 3). Thus, as shown in FIG. 19, cool or hot air due to driving of the body 1 of the air conditioning system and as indicated by arrows passes from the opened section of the intake portion 311A to the passages G, H, and I, and it is blown, with the range as indicated by two-dotted chain lines, from all the ventilator spout 313A in a wide area of the cabin including the passenger 23.

In the avoidance blow mode as shown in FIG. 16, the large portion 38c of the damper 38B closes a section corresponding to the passage G of the intake portion 311A, viz., a portion having a network in FIG. 20, and the small portion 38d of the damper 38B cooperate with the partitions 311i and 311j protruding in the intake portion 311A to close a section corresponding to the passage H of the intake portion 311A, viz., the portion having a network in FIG. 20, whereas the damper 39B assumes a position to open a section corresponding to the passage I of the intake portion 311A, viz., a void portion in FIG. 20. Thus, as shown in FIG. 20, cool or hot air due to driving of the body 1 of the air conditioning system and as indicated by arrows passes from the opened section of the intake portion 311A to the passage I defined by the guide vane 33A, and it is blown, with the ranges as indicated by two-dotted chain lines, from a portion of the ventilator spout 313A corresponding to the passage I in the cabin not including the passenger 23.

It is to be noted that the present invention is not limited to the aforementioned embodiments, and that various changes and modifications may be made without departing from the spirit and scope of the present invention. By way of example, the dampers 37 to 39, 37A to 39A, and 38B and 39B may be arranged to cross at an angle other than 90° as indicated by two-dotted chain lines in FIG. 3, obtaining the enlarged passage in the diffusion blow mode, resulting in the decrease in a flow resistance of cool or hot air.

Further, if the ventilator spout 313 or 313A is applied to a defroster spout or a foot spout, the air spout device 30 may be used in a defroster or a foot ventilator.

Still further, the air blow mode selecting mechanism 41 is of the manual type in the aforementioned embodiments. Alternatively, the blow mode selecting mechanism 41 may be of the automatic type in which the free end of the lever 43 is rotatably connected to the periphery of a member corresponding to the operation member 41 which is mounted to an output terminal of a motor serving as an actuator, or the shaft 40 or 40A or 40B is connected to the output terminal of the motor in a torque transmissible manner. Additionally, the blow mode selecting mechanism 41 may be of the automatic control type in which the motor is automatically controlled by a controller having a microcomputer for the body 1 of the air conditioning system.

Still further, in the aforementioned embodiments, with the outside air intake 6 opened by the intake door 8, and the ventilator duct 16 opened by the door 19, the air spout device may blow outside air, even during stoppage of the blower fan 9, in one of the concentration blow, diffusion blow, and avoidance blow modes.

Furthermore, the ventilator spout 313 or 313A is arranged within the instrument panel 20 or 20A in the aforementioned embodiments. Alternatively, the ventilator spout may be arranged within a roof or a side window. In that event, a defrosting mode and a local mode applying cool or hot air to only a particular part or arm of the passenger may be established in addition to the concentration blow, diffusion blow, and avoidance blow modes.

What is claimed is:

1. An air spout device for an air conditioning system, comprising:
    a duct including wall means for defining an open ended bore, said open ended bore having an inlet and an outlet;
    a plurality of guide vanes arranged in said open ended bore to define a plurality of passages;
    a plurality of dampers arranged between said inlet and said outlet to selectively open and close said plurality of passages, said plurality of dampers being movable to assume a plurality of positions, said plurality of dampers being combined to cross each other at a predetermined angle; and
    a blow mode selecting mechanism operatively connected to said plurality of dampers, said blow mode selecting mechanism allowing said plurality of dampers to assume said plurality of positions.

2. An air spout device as claimed in claim 1, wherein said predetermined angle is 90 degrees.

3. An air spout device for an air conditioning system, comprising:
    a duct including wall means for defining an open ended bore, said open ended bore having an inlet and an outlet;
    a plurality of guide vanes arranged in said open ended bore to define a plurality of passages;
    a plurality of dampers arranged between said inlet and said outlet to selectively open and close said plurality of passages, said plurality of dampers being movable to assume a plurality of positions, said plurality of dampers being combined to cross each other at a predetermined angle, said plurality of dampers being arranged to overlap with each other in the longitudinal direction thereof; and
    a blow mode selecting mechanism operatively connected to said plurality of dampers, said blow mode selecting mechanism allowing said plurality of dampers to assume said plurality of positions.

4. An air spout device as claimed in claim 3, wherein said plurality of dampers include a large portion, and small portion, respectively.

* * * * *